US012741288B2

(12) United States Patent
Göhmann et al.

(10) Patent No.: US 12,741,288 B2

(45) Date of Patent: Sep. 22, 2026

(54) SEPARATOR INSERT AND SEPARATOR

(71) Applicant: GEA WESTFALIA SEPARATOR GROUP GMBH, Oelde (DE)

(72) Inventors: Rüdiger Göhmann, Oelde (DE); Kai Helmrich, Drensteinfurt (DE); Kathrin Quiter, Drensteinfurt (DE); Andreas Schulz, Beckum (DE); Jürg Burkart, Rudolfstetten (CH); Simon Stöckli, Rehetobel (CH)

(73) Assignee: GEA Westfalia Separator Group GmbH, Oelde (DE)

( * ) Notice: Subject to any disclaimer, the term of this patent is extended or adjusted under 35 U.S.C. 154(b) by 642 days.

(21) Appl. No.: 18/021,062

(22) PCT Filed: Aug. 5, 2021

(86) PCT No.: PCT/EP2021/071876
§ 371 (c)(1),
(2) Date: Feb. 13, 2023

(87) PCT Pub. No.: WO2022/033952
PCT Pub. Date: Feb. 17, 2022

(65) Prior Publication Data

US 2023/0294110 A1 Sep. 21, 2023

(30) Foreign Application Priority Data

Aug. 14, 2020 (DE) ..................... 10 2020 121 420.0

(51) Int. Cl.
*B04B 1/08* (2006.01)
*B04B 7/04* (2006.01)
(Continued)

(52) U.S. Cl.
CPC .................. *B04B 1/08* (2013.01); *B04B 7/04* (2013.01); *B04B 7/08* (2013.01); *B04B 9/12* (2013.01); *B04B 11/02* (2013.01)

(58) Field of Classification Search
CPC .... B04B 1/08; B04B 7/04; B04B 7/08; B04B 9/12; B04B 11/02; B04B 7/02;
(Continued)

(56) References Cited

U.S. PATENT DOCUMENTS

| | | | | |
|---|---|---|---|---|
| 3,967,777 A | | 7/1976 | Canevari | |
| 4,759,744 A | * | 7/1988 | Krook | B04B 11/02 494/35 |

(Continued)

FOREIGN PATENT DOCUMENTS

| | | | | | |
|---|---|---|---|---|---|
| CN | 112221721 A | * | 1/2021 | | B04B 11/06 |
| DE | 102017128027 A1 | * | 5/2019 | | B04B 9/04 |

(Continued)

OTHER PUBLICATIONS

International Search Report and Written Opinion mailed Nov. 26, 2021 in related/corresponding International Application No. PCT/EP2021/071876.

(Continued)

*Primary Examiner* — Claire X Wang
*Assistant Examiner* — Shuyi S. Liu
(74) *Attorney, Agent, or Firm* — PATENT PORTFOLIO BUILDERS PLLC

(57) ABSTRACT

A separator insert for a separator includes a housing that is stationary during operation and is a container that is closed apart from multiple openings. These openings include a supply opening for an in-flowing suspension in a first axial boundary wall of the housing, two outlets for flowable phases of differing densities in an outer casing of the housing, and a recirculation inlet in a second axial boundary
(Continued)

Figure 1:
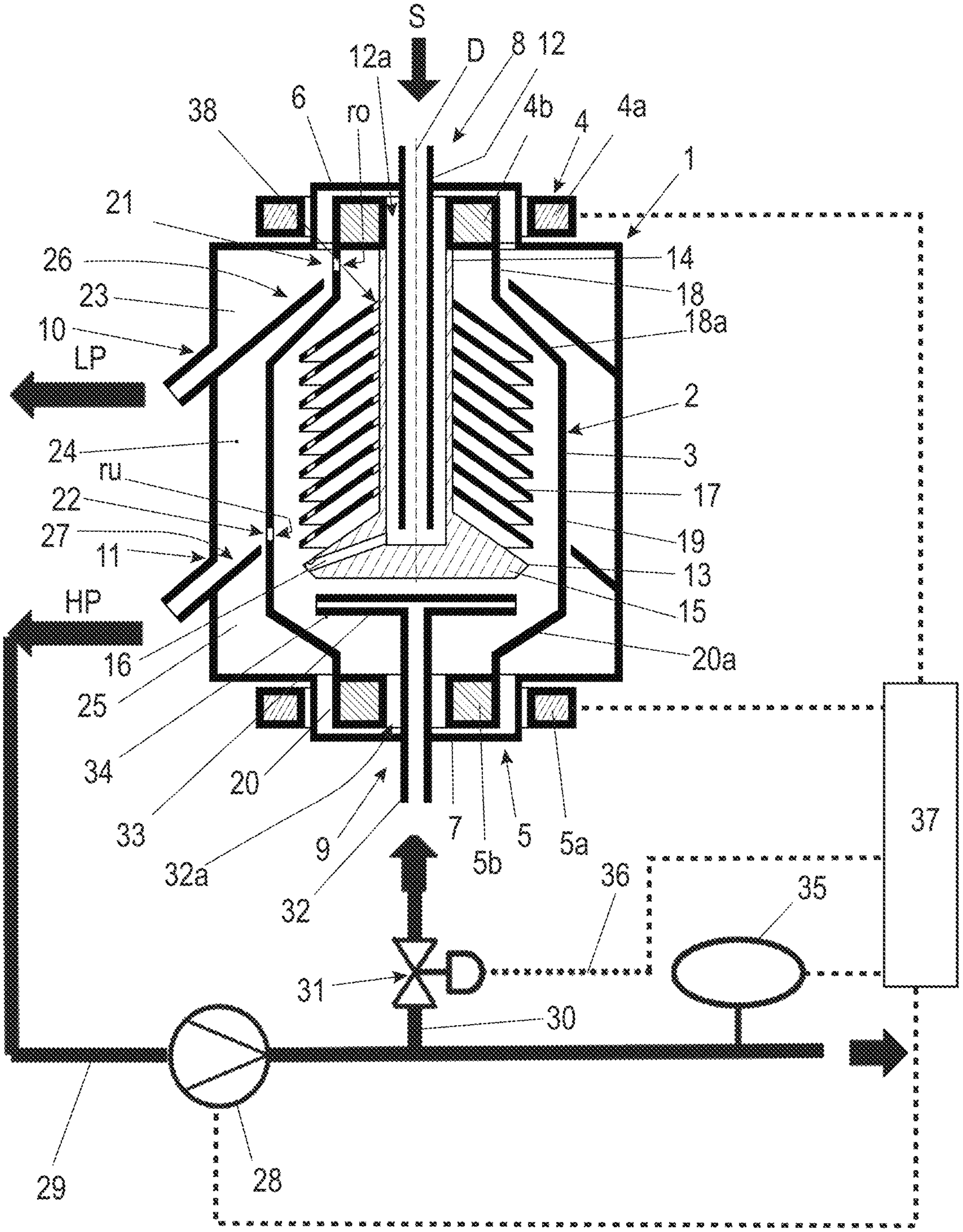

wall of the housing. A rotor within the housing can rotate about an axis of rotation and has a drum, which has multiple openings. A separator is arranged in the drum. At least two rotor units for magnetic bearing units are arranged at two axially spaced-apart points on the rotor with the drum, with which the rotor with the drum can be held in a suspended state, can be rotationally mounted and can be made to rotate within the housing during operation.

26 Claims, 4 Drawing Sheets

(51) Int. Cl.
*B04B 7/08* (2006.01)
*B04B 9/12* (2006.01)
*B04B 11/02* (2006.01)

(58) Field of Classification Search
CPC ......... B04B 9/04; B04B 5/0442; B04B 5/005; B04B 11/05; B04B 1/06; B04B 1/10; B04B 9/02; B04B 1/14; B04B 2001/2083; B04B 11/04; B04B 7/14; B04B 11/06; B04B 1/12; B04B 11/00; A61M 1/3693; A61M 1/3696; B01D 21/262; B01D 17/0217; B01D 2221/10; B01D 45/12; G01N 2035/00495; F01M 2001/1035; F01M 2013/0422; B03C 2201/28; B03C 2201/26; B03C 5/02; B03C 3/15; C12M 33/10; C12M 47/02
USPC ... 494/35, 42, 43, 60, 64, 65, 67, 68, 70, 72
See application file for complete search history.

(56) References Cited

U.S. PATENT DOCUMENTS

| | | | | |
|---|---|---|---|---|
| 2005/0054505 | A1* | 3/2005 | Maehans | B04B 1/08 494/6 |
| 2005/0176571 | A1 | 8/2005 | Merino et al. | |
| 2015/0202635 | A1 | 7/2015 | Spiegel et al. | |

FOREIGN PATENT DOCUMENTS

| | | | | |
|---|---|---|---|---|
| EP | 2273124 | B1 | 2/2015 | |
| EP | 3666394 | A1 | 6/2020 | |
| WO | WO-2014000829 | A1 * | 1/2014 | B04B 9/04 |

OTHER PUBLICATIONS

Search Report created Apr. 29, 2021 in related/corresponding DE Application No. 10 2020 121 420.0.

* cited by examiner

SEPARATOR INSERT AND SEPARATOR

BACKGROUND AND SUMMARY OF THE INVENTION

Exemplary embodiments of the invention relate to a separator insert for a separator and to a separator comprising such a separator insert.

Separators as defined in this document are used to separate a flowable suspension as a starting product in the centrifugal field into phases of different density. Steam sterilization of the separators used is necessary for a wide variety of applications. A relatively "small" steam-sterilizable separator with disk stack introduced to the market via the applicant is the separator "CSC 6" with 6000 $m^2$ equivalent clarifying area. However, in some situations, such as in the laboratory, this machine is still relatively large. The known separators with disk stack available on the market are driven by means of a spindle, which in turn is driven by a motor directly or via a gearbox. In addition, the known machines are made of stainless steel. For these reasons, filters are currently used very frequently in laboratories instead of centrifugal separators. In the case of a separator with a disk stack and with disposable plastic components (single-use technology—single use of pre-qualified plastic parts), steam sterilization (SIP—Sterilization In Place) would not be necessary. It could be particularly suitable for use in biotechnology.

WO 2014/000829 A1 discloses a separator for separating a flowable product into different phases and which has a rotatable drum with a drum lower part and a drum upper part and a means arranged in the drum for processing a suspension in the centrifugal field of solids or for separating a heavy solid-like phase from a lighter phase in the centrifugal field, wherein one, several or all of the following elements consist of plastic or a plastic composite material: the drum lower part, the drum upper part, the means for clarifying. In this way it is possible to design a part of the drum or preferably even the entire drum—preferably together with the inlet and outlet systems or areas—for single use, which is of particular interest and advantage with regard to the processing of pharmaceutical products such as fermentation broths or the like, since after operation for the processing of a corresponding product batch in preferably continuous operation during the processing of the product batch, no cleaning of the product-contacting parts of the drum has to be carried out, but the drum as a whole can be replaced. Especially from a hygienic point of view this separator is thus very advantageous. In order to achieve a physical separation between this disposable drum and the drive, a contact-free coupling between the drive and the drum is advantageous.

A further development is shown in DE 10 2017 128 027, in which the bearing devices are designed as magnetic bearings and one of the magnetic bearing devices is preferably also used as a drive device for rotating the drum, which is held in suspension during operation. This eliminates the need for mechanical components for rotating and supporting the drum, which favors the design as a separator with a separator insert for single use, since replacement of this separator insert is very easy to handle. These advantages are also exploited by the present invention.

Against this background, exemplary embodiments of the invention to provide a generic separator insert, which can be used or designed as a one-way element, in such a way that the separation process can be better controlled. Preferably, a possibility for regulating capability of the concentration of the separated heavy phase or clarity of the light phase is also to be provided in a simple manner.

According to embodiments of the invention a separator insert for a separator is designed for separating a flowable suspension in a centrifugal field into at least two flowable phases of different density and comprises the following:

a) a housing which is stationary during operation and which is designed in the form of a container which is closed except for openings, wherein these openings are designed as follows: as a supply opening for an inflowing suspension in a first axial boundary wall of the housing, as two outlets for flowable phases of different density in an outer casing of the housing and as a recirculation inlet in a second axial boundary wall of the housing;

b) a rotor which is arranged within the housing and is rotatable about an axis of rotation and having a drum which has openings, wherein one or more first and second openings of the drum serve as free radial outlets for the light and the heavy phase into the housing, and wherein a feed pipe extends into two further of the openings of the drum at each of the two axial ends of the drum, which pipe does not touch the drum;

c) wherein a separation means is arranged in the drum, and d) wherein at least two rotor units for magnetic bearing devices are arranged at two axially spaced-apart points on the rotor with the drum, with which the rotor with the drum can be held in a suspended state, can be rotatably mounted and can be made to rotate within the housing during operation.

The recirculation inlet, which is advantageously provided on the drum and the housing, makes it possible to control the separation process particularly well.

The openings of the drum are thus advantageously associated with the openings of the housing from a).

It is preferably provided in this context that the separator insert forms a pre-assembled, exchangeable unit for insertion into stator units on the frame of the separator. In interaction, the rotor and stator units form magnetic bearing devices. With these, the drum can be supported axially and radially and held in suspension.

"In operation" means during a or the centrifugal processing when the rotor is turning.

It is preferred, because it is simple and practical, that the rotor units are arranged at both axial ends of the drum and that two corresponding stator units are formed on the frame of the separator. In this way, magnetic bearing devices are formed at both axial ends of the drum.

At least one of the two magnetic bearing devices preferably also represents the rotary drive for the drum, wherein this drive is also suitable for driving the drum at freely adjustable speeds or in a freely selectable direction of rotation. It may preferably be provided in this context that one or both magnetic bearing devices can act as radial and axial bearings and hold the rotor in suspension in the container at a distance from it during operation.

It is particularly advantageous and practical that the separator insert is designed as a pre-assembled unit. In particular, it can also be provided that all elements of this insert which come into contact with the product are made of plastic or another non-magnetic material, wherein it can be replaced as a whole and can be completely disposed of after use. Cleaning and, optionally, steam sterilization of the separator insert are thus no longer necessary.

Each of the feed pipes can advantageously pass axially through one of the magnetic bearing devices, although it is also possible for the feed pipes to surround each other coaxially and together pass axially through only one of the magnetic bearing devices.

The respective bearing device, which in addition to a radial bearing arrangement also provides an axial bearing arrangement for the drum and/or a rotary drive, can act permanently magnetic and/or electromagnetically.

According to a preferred design, it is provided that the two outlets for flowable phases of different densities are associated with one or more trapping ring chambers of the housing in order to be able to separately trap the phases in the housing before they are discharged therefrom.

It can be further simply provided by design that the supply opening is formed by a non-rotatable feed pipe projecting with one end from the housing to a first side, in particular with vertical alignment of the axis of rotation upwards, and outwards and which extends through the first axial boundary wall and through the one magnetic bearing into the drum, but does not touch the latter in the process. At the outer circumference, the feed pipe is preferably inserted in the housing in a sealed manner or is formed integrally therewith.

It may also be provided further that the feed pipe passes through the housing concentrically to the axis of rotation of the rotor, then extends axially further inside the housing into the rotatable drum and ends there with its other end—a free outlet end—in front of or in a distributor rotating with the drum. The suspension is fed into the centrifugal chamber through this feed pipe.

Then, according to a further embodiment, which is easy to implement, it can be provided that the drum has at least two sections of different diameter and that, for discharging the respective phases of different density from the drum, in each case at least one or more outlets are provided in the outer casing of the drum in the sections of different diameter, which in each case have one or more openings, in particular nozzle-like openings in the outer casing of the drum, and thus form the free outlets into the respective trapping ring chambers.

The drum can be single-conical or double-conical for this purpose. It may also have one or more cylindrical sections. Moreover, it may be composed of several parts, in particular an upper part and a lower part, with these parts preferably being joined together (e.g., by gluing or welding) after the installation of internal components and their assembly. Similarly, the housing can be composed of several parts, in particular an upper part and a lower part, with these parts preferably being connected to each other (e.g., by gluing or welding) after the installation of internal components—in particular the rotor—and their assembly.

Typically, one of the outlets will be located on a section with a largest internal diameter and another outlet will be located on a section with a relatively smaller diameter of the drum.

According to a further practical design, it can be provided that the respective outlet for the respective lighter or heavier phase is formed at the lowest point of the respective trapping ring chamber. The outlets can have nozzles on the outside of the housing, which are sealed on the outer circumference of the housing, so that hoses or the like can be easily connected in this way. The hoses can also be pre-assembled on the nozzles so that they are completely and, if required, germ-free sealed. The nozzles can extend, for example, radially, tangentially, or obliquely to the radial direction.

Then, according to a preferred design, it may be further provided that the light phase or the heavy phase emerging from one of the outlets can be conveyed away from the housing by a discharge line with a pump in each case, and that a branch line is provided that opens into the recirculation inlet, so that a recirculation line is formed for returning at least part of the light or the heavy phase to the drum. Returning the light or the heavy phase into the feed pipe may also be useful for certain applications. In this way, the controllability or regulatability of the separation process is significantly improved. Preferably, the heavy phase is recirculated, as this leads to particularly advantageous results.

According to a variant that is easy to implement in terms of design, the light or heavier phase to be recirculated can be pumped into the drum by means of a pump.

According to a further embodiment, it is then provided in a structurally advantageous and compact manner that the recirculation inlet has a second feed pipe passing through the second axial boundary wall of the housing and opens into a second distributor in the drum, which does not rotate with the drum during operation and by means of which the recirculated phase is transferred into the rotating drum. The feed pipe and distributor can also be manufactured as one part. The distributor effects the deflection in the radial or circumferential direction.

At the outer circumference, this feed pipe can also be inserted into the housing in a sealed manner or be formed integrally with it.

It can then be provided expediently and advantageously that a controllable regulating valve is provided with which the recirculation inlet can be shut off or fully or partially opened. By controlling the regulating valve, a precisely metered portion of the heavier solids phase HP can be returned to the drum. This results in an optimization of the separation process.

In addition, optionally at least one measuring device can be provided with which a parameter of the first phase and/or the second phase can be determined and/or a control device can further be provided with which the recirculation is controlled or regulated, in particular by using one or more results of measurements with the measuring device. Optionally, the control of the regulating valve can be carried out within the framework of a regulation for which a parameter is measured.

The measured value of the second phase HP recorded by the measuring device, e.g., its density, turbidity, flow rate, is forwarded to the control device, wherein the control valve can then be regulated to a specific opening diameter using a regulating algorithm.

It may be further preferred that a separation means, in particular a disk stack, is arranged in the drum.

This separator is suitable for operation at variable, even relatively high speeds. In addition, it can also be used well for one-off processing—for example, for centrifugal separation of a product batch of a flowable fermentation broth as a suspension—from e.g., 100 L to several thousand, e.g., 4000 L—into different phases and then disposed of. Here, a particular advantage is that all product-contacting components of the separator can be installed, operated, and subsequently disposed of as a prefabricated and already aseptic unit. This prefabricated unit consists at least of the rotor with the drum, the separating disks, the feed distributor, and the rotor magnets or rotor units, as well as the housing with the inlets and outlets. Furthermore, the unit can also contain inlet and outlet lines (e.g., hoses) as well as measuring equipment or other components that come into contact with the product, which are intended for single use and are disposed of together with the separator unit after use.

A further advantage is that, in addition to a lower axial bearing in the first vertical alignment of the axis of rotation, a further axial bearing—e.g., at an opposite end of the drum or possibly also in the drum—is provided. This is because this allows the axis of rotation of the drum to be arranged vertically, but alternatively also advantageously inclined from the vertical. Any arrangement of the axis of rotation is possible. The axis of rotation can thus, for example, be inclined from the vertical at an angle of 30-60°, for example 45°, or it can also extend in a horizontally aligned manner, i.e., be aligned inclined by 90° to the vertical. Furthermore, it is also possible to rotate the entire arrangement by 180°, so that the feed opening is arranged at the bottom and the conical separating disks open upwards—without this causing storage problems for the drum.

Insofar as "a first vertical orientation of the axis of rotation" is considered here or below, this means that the position of the elements of the centrifuge in a vertical orientation of the axis of rotation as described can be realized or is realized. In practice, however, the axis of rotation can then also be aligned at an angle to the vertical alignment. In this case, the outlet for the LP, HP phases is preferably placed at a vertically lowest point of the respective trapping ring chambers.

It is further advantageous if one of the bearing and/or drive units is designed to radially support and rotate the drum in a first vertical orientation at its lower end.

Finally, it can be advantageously provided that the housing has only the openings for feed pipes and outlets and is otherwise hermetically sealed. For this purpose, it can be provided that the feed pipes and the outlets project outwardly from the housing in the manner of nozzles, with these nozzles being connected to the housing in a sealed manner or being formed integrally therewith.

The invention also provides a separator having a frame and an exchangeable separator insert.

This facilitates the creation of a separator that has a disposable module with disposable "drum" and "housing" components, whereas at least the frame and parts of the bearing and drive assembly can be reusable.

The invention enables the manufacture of a separator in which a disposable separator insert can be used, which is preferably designed in such a way that all components in contact with the product are made of plastic or other non-magnetic materials which can be disposed of after single use. Cleaning after use is thus not necessary. The machine and its operation can thus be made significantly less expensive. Magnets can be recycled if necessary.

After its manufacture, the entire separator insert is provided as a sealed unit into which no impurities can enter. For this purpose, the nozzles can be sealed and detachably closed. Thus, hose sections can be arranged on the nozzles which have openable and closable connectors with which the separator module or, in this case, the separator insert can be connected to further elements of the feed and discharge system such as bags or tanks or hose or pipe lines.

It is simple and safe if the bearing devices are mounted on the frame at a distance from each other, between which the separator insert can be inserted in a rotationally fixed manner.

For this purpose, it may be further provided that the relative distance of the receptacles on the console is adjustable in order to be able to change the separator insert.

It can further be provided that the separator insert can be fastened to the frame in a form-fitted and/or force-fitted manner in a rotationally fixed manner. According to a particularly simple variant, for this purpose the housing and at least one of the or all of the aforementioned receptacles have corresponding form-fitting means for holding the housing in a rotationally fixed manner on the frame or the stator unit or units. For this purpose, the stator units of the frame, for example, each have a plurality of pins projecting in the axial direction, and the respective separator insert can have corresponding blind holes on the housing, for example extending in the axial direction, as recesses (not shown here).

The position of these corresponding form-fitting means also defines the functionally required position of the stator units 4$a$, 5$a$ and the rotor units 4$b$, 5$b$ relative to each other. This relates in particular to the precise centering of the units 4$a$, 5$a$ and 4$b$, 5$b$, which lie coaxially one inside the other. Optionally, a holding force (from above and below) can also be exerted on the housing in the axial direction by the receptacles in order to hold it frictionally, if necessary.

The corresponding form-fitting means can be arranged symmetrically but also asymmetrically to ensure that the separator insert can only be used in a single orientation.

It may also be provided if at least one control device is provided with which the amount of recirculation of the light or the heavy phase—in particular using one or more results of measurements with the measuring device—can be controlled or regulated.

BRIEF DESCRIPTION OF THE DRAWING FIGURES

Figure 2:
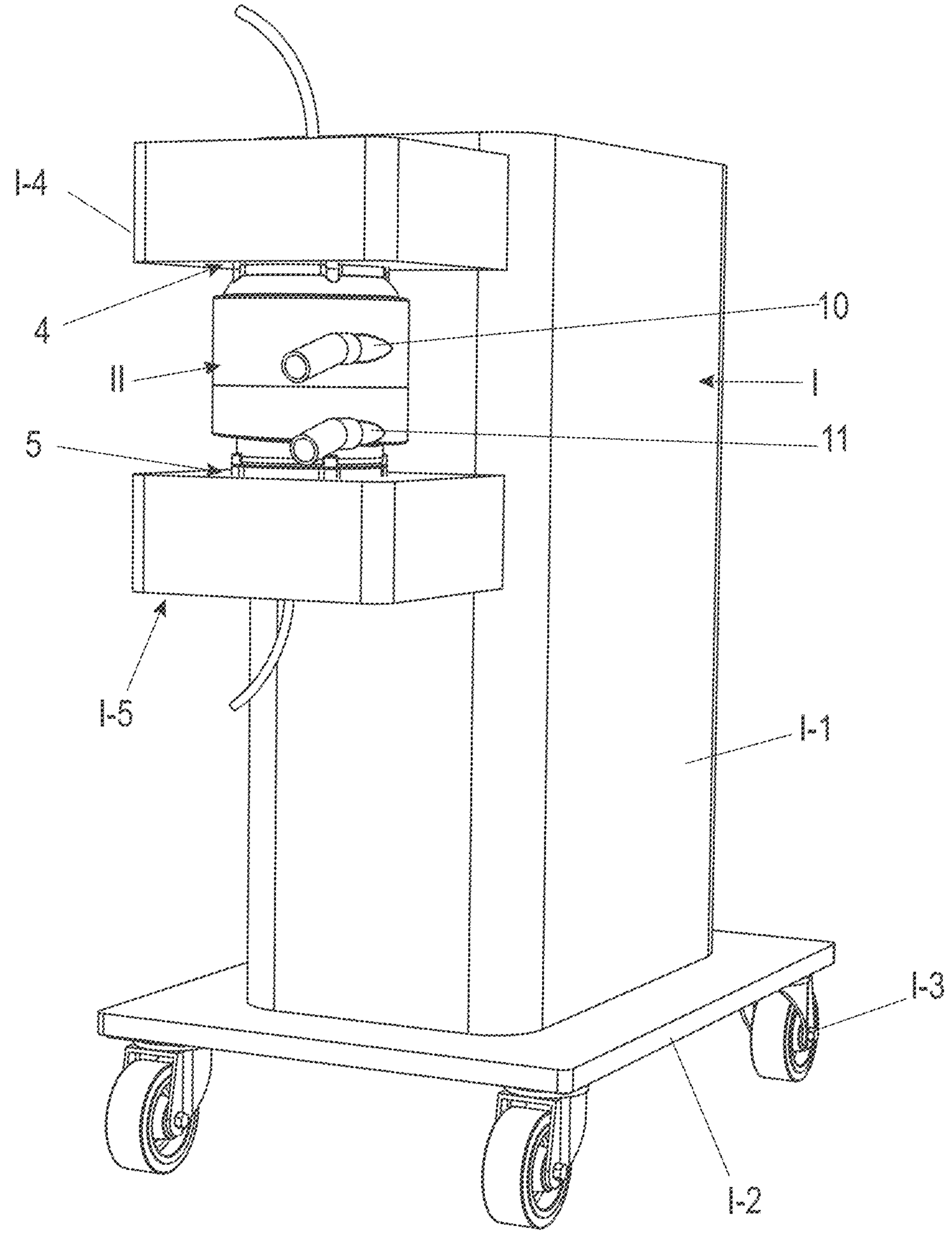
Figure 3:
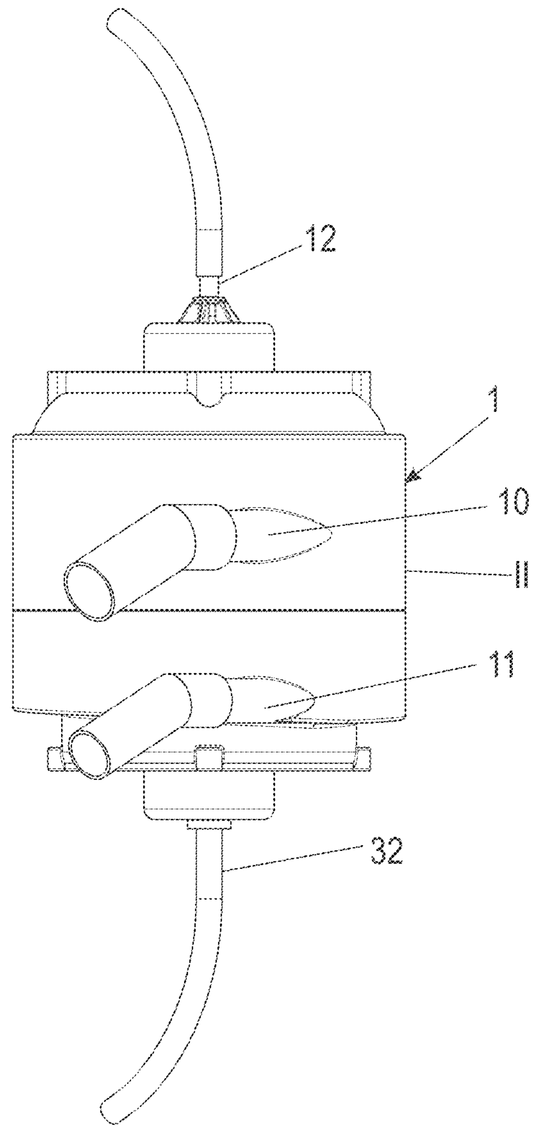
Figure 4:
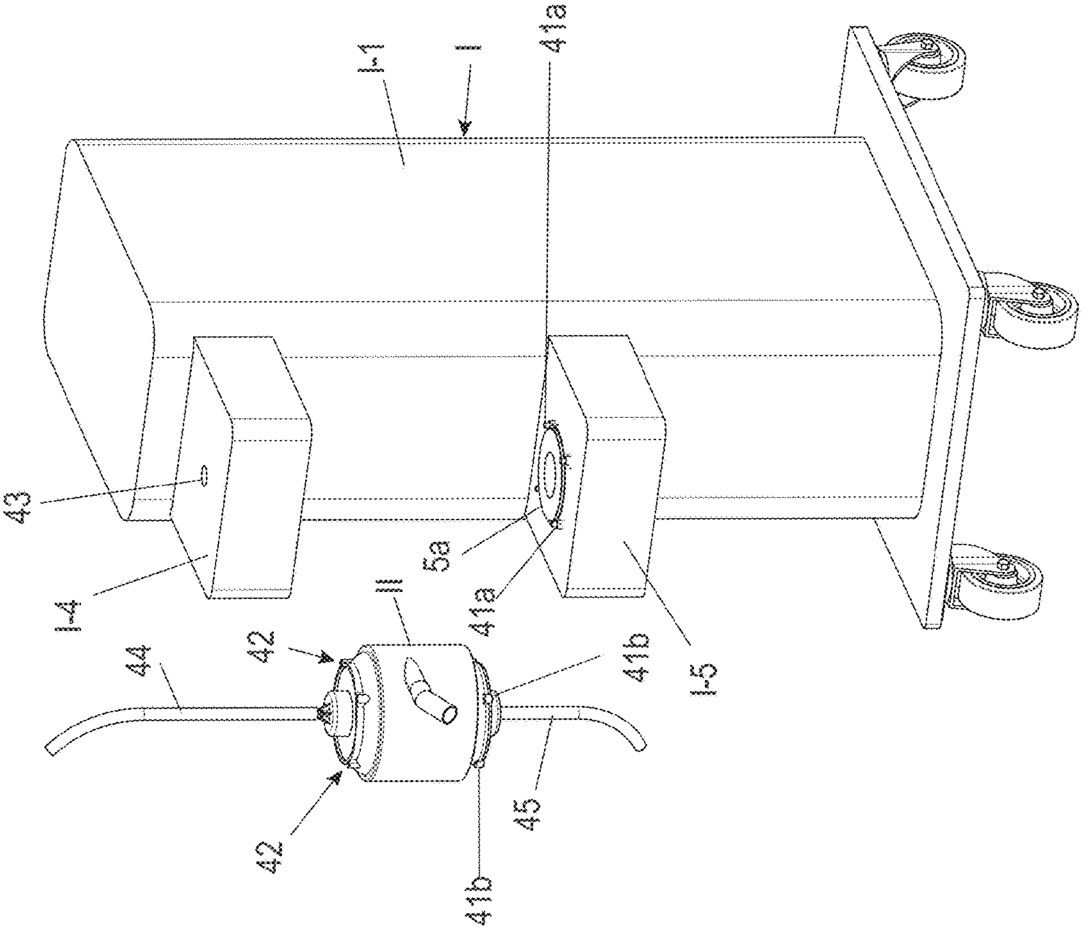

In the following, the invention is described in more detail by means of exemplary embodiments with reference to the drawing, wherein further advantageous variants and designs are also discussed. It should be emphasized that the exemplary embodiments discussed below are not intended to describe the invention conclusively, but that variants and equivalents not shown are also feasible and are covered by the claims, wherein:

FIG. 1: shows a schematic, sectional view of an exchangeable separator insert of a separator together with a schematic view of a feed and discharge system and a control unit of the separator or the separator insert;

FIG. 2: shows a schematic representation of a separator with a reusable frame and an exchangeable separator insert in the manner of FIG. 1;

FIG. 3: shows a perspective view of the exchangeable separator insert of FIGS. 1 and 2 with hose sections arranged thereon;

FIG. 4: shows a perspective view of the separator of FIG. 2 with the separator insert removed;

DETAILED DESCRIPTION

FIG. 2 shows a separator with a reusable frame I and with an exchangeable separator insert II for centrifugal separation of a product—a suspension S—into different dense phases HP, LP.

The separator insert II is preferably designed as a prefabricated unit. In particular, the separator insert II is designed as a disposable separator insert that can be exchanged or replaced as a whole and is designed as a pre-assembled unit, which is made entirely or predominantly of plastic or plastic composite materials.

The separator insert is shown separately as an example in FIGS. 1 and 3. It can be disposed of after processing a product batch and replaced with a new separator insert II.

Such a separator can be useful and advantageous in the processing of products where it can be ruled out with a very high degree of certainty that impurities will be introduced into the product—a flowable suspension or its phases— during centrifugal processing, or where cleaning and disinfection of the separator would be very costly or not possible at all.

The frame I has a console I-1. This can—but does not have to—be mounted on a carriage I-2 with rollers I-3. Receptacles I-4 and I-5 can be arranged on the console I-1, which serve to receive and hold the separator insert II also during operation. Preferably, a first axial end of the separator insert II projects from below into the upper receptacle I-4 and a lower end of the separator insert II projects from above into the other receptacle I-5.

In the respective receptacles I-4 and I-5, respective stator units 4*a*, 5*a* of two drive and magnetic bearing devices 4 and 5 can be arranged. The control and power electronics for this can be arranged in the frame I, e.g., in the console I-1.

Here, these receptacles I-4 and I-5 protrude laterally from the console I-1 of the frame I. They can be arranged on the console I-1 in a height-adjustable manner.

Corresponding form-fitting means 41*a*, 41*b* can be formed on the receptacles I-4 and I-5 and on a housing 1 of the separator insert II, which does not rotate during operation, in order to be able to insert the separator insert II into the stator units 4*a*, 5*a* in a rotationally fixed manner. The upper and lower stator units 4*a*, 5*a* can each have axes in alignment with one another.

For changing the separator insert II, it can be provided that the two receptacles I-4 and I-5 with the stator units 4*a*, 5*a*, are arranged on the console I-1 so that they can move axially—and here also vertically by way of example—relative to one another, in particular displaceably.

In this case, for example, it can be advantageously provided that the receptacles I-4 and I-5 with the stator units 4*a*, 5*a* on the frame I can be moved axially apart and towards each other again in order to change the separator insert II, i.e., in order to be able to remove the old separator insert II from the frame I and exchange it for a new one. For this purpose, it can be further provided that the relative distance of the receptacles I-4 and I-5 with the stator units 4*a*, 5*a* of the bearing devices 4, 5 can be adjusted in order to be able to change the separator insert II.

It can further be provided that the separator insert II can be attached to the frame I in a form-fitted and/or force-fitted manner in a rotationally fixed manner. According to a particularly simple variant, the housing 1 and the stator units 4*a*, 5*a* can have corresponding form-fitting means such as projections (e.g., pins) and recesses (e.g. bores) for this purpose, in order to hold the housing 1 in a rotationally fixed manner on the stator units and thus on the frame II. The corresponding form-fitting means can also be formed directly on the frame II.

In the following, with reference to FIG. 1, the structure of a preferred separator insert II is described in more detail, together with the structure of the drive and bearing system of the separator, the control system of the separator and the feed and discharge system of the separator.

According to FIG. 1, the separator insert II of the separator has a housing 1 and a rotor 2 inserted into the housing 1 and rotatable relative to the housing 1 during operation.

The rotor 2 has an axis of rotation D. This can be aligned vertically.

The rotor 2 of the separator insert II also has a rotatable drum 3. The rotor 2 is rotatably mounted at two locations axially spaced from one another in the direction of the axis of rotation by means of respective magnetic bearing devices 4, 5. Preferably, it is so mounted at its two axial ends. In this case, the separator insert has rotor units 4*b*, 5*b* of the magnetic bearing devices 4, 5. In contrast, stator units 4*a*, 5*a* of the magnetic bearing devices 4, 5 are arranged on the frame I-1.

The magnetic bearing devices 4, 5 preferably act radially and axially and preferably hold the rotor 2 in suspension in the housing 1 at a distance from the latter.

In this context, the rotor units 4*b*, 5*b* may be formed essentially in the manner of inner rings of magnets, in particular permanent magnets, and the reusable stator units 4*a*, 5*a* may be formed essentially in the manner of outer rings for axial and radial bearing of the rotor 2 (e.g., at the top) or alternatively for rotary drive (e.g., at the bottom).

Thus, the rotor units 4*b* and/or 5*b*, as part of the separator drive, also constitute part of the rotating system or rotor. In other words, the rotor of the drive is thus a part of the drum of the centrifugal separator.

One or both of the magnetic bearing devices 4, 5 is/are thus preferably also used in addition as a drive device for rotating the rotor 2 with the drum 3 in the housing 1. In this case, the respective magnetic bearing device forms a combined magnetic bearing and drive device. The magnetic bearing devices 4, 5 can be designed as axial and/or radial bearings which support the drum 3 at its ends during operation in an overall cooperating axial and radial manner and hold it suspended and rotate it overall during operation.

The magnetic bearing devices 4 and 5 can have the same or largely the same basic design. In particular, only one of the two magnetic bearing devices 4, 5 can also be used as a drive device in a supplementary manner. Corresponding components of the magnetic bearings 4, 5 are thus formed in each case on the separator insert II—on its rotor 2—and other corresponding parts on the frame I. One or both stator units 4*a*, 5*a* can also be electrically connected to control and power electronics for driving the electromagnetic components of the magnetic bearing devices.

The respective magnetic bearing device 4, 5 can, for example, operate according to a combined electromagnetic and permanent-magnetic principle.

Preferably, at least the lower axially acting magnetic bearing device 5 serves to keep the rotor 2 axially suspended within the housing 1 by levitation. It can have one or more first permanent magnets, for example on the underside of the rotor, and further have electromagnets on a receptacle on the frame which coaxially surround the permanent magnet or magnets. The drive of the rotor can be achieved electromagnetically. However, a drive via rotating permanent magnets can also be realized.

Such bearing and drive devices are used, for example, by the company Levitronix for driving centrifugal pumps (EP2 273 124 B1). They can also be used within the scope of this specification. For example, a first Levitronix motor "Bottom" can be used as a drive, which at the same time magnetically supports the drum radially and axially. In addition, a second Levitronix motor—for example identical in construction except for the control in operation—can be provided, which as the magnetic bearing 4 can radially and axially support the rotor 2 at the head.

The rotor speed can be variably adjusted with the aid of a control device 37 or a separate control device for the magnetic bearings 4, 5. Likewise, the direction of rotation of the rotor 2 can be specified and changed with the control device.

During operation, the rotor 2 rotates, thus being held axially in suspension and radially centered. Preferably, the rotor 2 is operated with the drum 3 at a speed of between 1,000, preferably 5,000 to 10,000, and possibly also up to 20,000 revolutions per minute. The centrifugal forces generated as a result of the rotation lead to the separation of a suspension to be processed into different flowable phases LP, HP of different density, as already described above, and to their discharge, as described in more detail below. The product batch is processed in continuous operation, which means that the phases separated from the suspension are completely discharged from the drum again during operation.

This makes it very possible to create a separator insert and housing for a separator that can be designed for single use, which in turn is of particular interest and advantage for the processing of pharmaceutical products such as fermentation broths or the like, because, after operation for processing, a corresponding product batch in preferably continuous operation during the processing of the product batch, no cleaning of the drum needs to be carried out, since the entire separator insert can be replaced. Optionally, individual elements such as magnets can be suitably recycled (see also DE 10 2017 128 027 A1).

The housing 1 is preferably made of a plastic or plastic composite material. The housing 1 can be cylindrical and have a cylindrical outer casing, at the ends of which two radially extending boundary walls 6, 7 (cover and base) are formed.

The drum 3 is used for centrifugal separation of a flowable suspension S in a centrifugal field into at least two phases LP, HP of different density, which may be, for example, a lighter liquid phase and a heavy solid phase or a heavy liquid phase.

In a preferred design, the rotor 2 and its drum 3 have a vertical axis of rotation D. However, the housing 1 and the rotor 2 could also be oriented differently in space. The following description refers to the vertical orientation shown. In case of a different orientation in space, the alignments change along with the new orientation. In addition, one or both outlets—still to be discussed—may optionally be arranged differently.

The rotor 2 of the separator with the drum is also preferably made of a plastic or plastic composite material.

The drum 3 is preferably cylindrical and/or conical, at least in sections. The same applies to the other elements in the rotor 2 and on the housing 1 (except for elements of the magnetic bearing devices 4, 5).

The housing 1 is designed in the manner of a container, which is advantageously hermetically closed except for a few openings/opening areas (to be discussed). These openings are a supply opening 8 in the first—here upper—axial boundary wall 6, a recirculation inlet 9 in the second—here lower—axial boundary wall 7, and two outlets 10, 11 in a circumferential outer casing and a circumferential outer wall of the housing 1, respectively.

The drum 3 also has openings that are functionally associated with the openings of the housing.

First and second openings of the drum 3 (which may be provided on the drum 3 in a circumferentially distributed manner, thus several first and second openings may be provided on the drum 3 in each case) serve as radial outlets 21, 22. Feed pipes 12, 32 extend into two further openings 12*a*, 32*a* at the two axial ends of the drum 3 in each case in a manner to be explained.

The supply opening 8 is advantageously formed by a non-rotatable feed pipe 12, which projects outwardly from the housing 1 at the top with one end and which extends through the upper boundary wall 6 into the drum 3, but does not touch the drum 3. At the outer circumference, the feed pipe 12 is inserted into the housing 1 in a sealed manner—e.g., by welding or bonding—or, optionally, is made in one piece with the housing as a plastic injection-molded part. It is preferably also made of plastic.

The feed pipe 12 passes concentrically to the axis of rotation of the rotor 2 through the housing 1 and the one magnetic bearing 4, then extends axially further inside the housing 1 into the opening 12*a* of the rotatable drum 3 and ends there in the drum 3 with its other end—a free outlet end.

Thus, the opening 12—the feed pipe—of the housing is functionally associated with the opening 12*a* of the drum.

The feed pipe 12 opens into the drum 3 in a distributor 13, which can rotate with the drum 3. The distributor 13 has a tubular distributor shank 14 and a distributor foot 15. One or more distributor channels 16 are formed in the distributor foot 15. A separator disk stack, consisting here of conical separator disks 17, can be placed on the distributor 13. The distributor 13 and the separator disks 17 are preferably also made of plastic.

The drum 3 has sections of different diameters so that the discharge of the different dense phases can take place on different diameters.

In a preferred—but not mandatory—design, the drum 3 here has at least two cylindrical sections 18, 19 of different diameter. Adjacent to these, one or more conical transition areas can be formed on the drum 3. The drum 3 can also have a single or double conical design overall in its central axial region on the inside (not shown here). The discharge of the heavier phase HP then takes place in particular on the largest inner diameter.

As shown, the drum 3 may have a lower cylindrical section 20 of smaller diameter, on/in which the rotor unit 5*b* of the lower magnetic bearing is also formed, which merges into a conical section 20*a*, then here for example a cylindrical section 19 of larger diameter, then again a conical section 18*a* and then an upper cylindrical section 18 of smaller diameter, on which the rotor unit 4*b* of the upper magnetic bearing 4 is formed.

Two or more outlets 21, 22 are provided in the outer casing of the drum 3 in the sections 18, 19 of different diameters for discharging the phases of different density from the drum 3. These outlets 21, 22 can further preferably be formed as one or more openings, in particular nozzle-like openings, in the outer casing of the drum 3. They are thus designed as so-called "free" outlets.

Here, the first outlet 21 in section 18 of smaller diameter serves to discharge the lighter phase LP and the second outlet 22 in section 19 of larger—here "largest"—diameter serves to discharge the heavier phase HP.

The phases emerging from the drum 3 are collected in the housing 1 in axially offset trapping ring chambers 23, 24 of the housing 1. These trapping ring chambers 23, 24 are designed in such a way that the phase intercepted in them is guided to one of the outlets 10, 11 of the respective trapping ring chamber 23, 24. This can be achieved in that the respective outlet 10, 11 is located at the lowest point of the respective trapping ring chamber 23, 24. The trapping ring chambers 23, 24 are open radially inwards and are designed in such a way that liquid spraying out of the respective outlet 21 or 22 is essentially only sprayed into the associated trapping ring chamber 23, 24—which is at the same axial level—during centrifugal separation.

A further third chamber 25, which does not serve to discharge a phase, can optionally be formed below the second trapping ring chamber 24. This chamber 25 can optionally have a leakage drain (not shown here).

The first and second trapping ring chambers 23, 24 may be separated from each other by a first wall 26, which is conical in this case and extends conically inwardly as well as upwardly from the outer casing of the housing 1 and ends radially in front of the drum 3 at a distance therefrom.

The second trapping ring chamber 24 may also be bounded downwardly by a conical wall 27, which extends inwardly as well as upwardly in a conical manner from the outer casing of the housing 1 and terminates inwardly at a radial distance from the drum 3.

Preferably at the lowest point of the respective trapping ring chamber, the respective product phase LP and HP is discharged from the housing 1 through the respective outlet 10, 11. Nozzles can be provided on the outside of the housing 1 in the area of the respective outlet 10, 11 in order to be able to connect lines and the like easily. These can in turn be formed directly with the housing or be adhesively attached to it. The nozzles are preferably also made of plastic. The housing 1 can be composed of several plastic parts which are, for example, connected to one another in an adhesive or welded sealed manner.

It is further provided that one of the two product phases LP, HP, preferably the heavier product phase HP of the two derived product phases LP, HP, can be partially recirculated into the drum 3.

In particular, it may be provided that this heavy phase HP is pumped away from the outlet 11 by a pump 28 through a line 29. This line 29 can be designed as a hose.

This line can be in the form of a hose, which can optionally also have a buffer tank or bag on the suction side of the pump.

It is provided that a branch line 30 branches off from line 29.

This branch line 30 can also be designed as a hose. Both the branch line 30 and/or the line 29 downstream (in the direction of flow) of the branch to the branch line 30 can have a controllable, in particular electrically controllable, regulating valve 31. A regulating valve may have an open and a closed position as well as intermediate positions (half-open, etc.).

The branch line 30 opens into the recirculation inlet 9, which can be formed at the second—in this case lower—end of the drum 3 and the housing 1 facing away from the inlet. In this way, a recirculation line is formed with which the heavy phase HP can be returned to the drum 3.

The recirculation inlet 9 comprises the second feed pipe 32, which extends analogously to the first feed pipe 12—but from below—through the second—here lower—radially extending boundary wall 7 into the drum 3 and ends there in a second distributor 33 and/or is connected thereto, the distributor channels 34 of which extend radially. The second feed pipe is also of non-rotating design and is connected to the housing 1 in a sealed manner.

Thus, two distributors 13, 33 are provided. It is preferred that the first distributor 13 rotates with the drum 3 during operation and that the second distributor 33 does not rotate with the drum during operation. The phase to be recirculated—in this case HP—is pumped back into the drum through this distributor.

The second distributor 33 can be designed as a kind of non-rotatable distributor disk, which can be aligned perpendicularly to the axis of rotation and can also have one or more superordinate radially extending distributor channels 34, with which the recycled phase HP is pumped radially outwardly into the drum 3 as it enters the drum, and there preferably in the circumferential and rotational direction of the drum. It can be expediently provided that the distributor channels 34 in the distributor 33 extend spirally with the direction of rotation in operation.

The distributor 33, which is disk-like in this case, projects radially into the drum to such an extent that it can be used to transfer the liquid into the rotating drum 3 in such a way that no liquid escapes axially through the lower opening 32*a* of the drum. Instead, the liquid flowing out of the distributor is accelerated in the drum by the latter—e.g., with ribs/channels not shown—to peripheral speed.

The lighter phase LP leaves the drum 3 on a radius ro. From there, it flows through the upper outlet 10 into the housing 1, circling in the catching clamp 23 due to its momentum.

The operation of the separator 21 is briefly described below.

First, the separator is provided with its reusable components. These include the frame I and the drive and stator units 4*a*, 5*a* of the magnetic bearing devices. This further includes a control unit 37.

Then a separator insert II is provided and mounted on the rack I.

This separator insert can preferably also have at least hoses and nozzles that can be connected to further lines (not shown here) as well as containers such as bags, tanks, pumps and the like.

Then, after connecting the pipes and hoses and the like, a suspension is fed into the rotating drum (supply opening 8) and separated there centrifugally into the light phase LP and the heavy phase HP.

The heavier phase HP of greater density flows radially outward in the drum 3 in the separation chamber. There, the phase HP leaves the drum at a radius ru. The lighter phase LP flows radially inward in the drum 3 in the separation chamber and rises upward through a channel 38 on a shaft of the distributor. There, the phase LP leaves the drum at a radius ro. The radius of the separation zone between the two phases within the disk stack can be adjusted by the ratio of ro to ru and the number and size of the openings, and the flow rates of the individual phases can thus be coordinated.

Both the light phase LP and the heavy phase HP are discharged freely from the drum 3 via openings as outlets 21, 22 during continuous operation.

Part of the heavy phase is returned to the drum 3 via the recirculation inlet 9 and the distributor 33. In this way, the concentration of the heavy phase can be easily influenced and the separation process optimized. In particular, by suitably controlling the regulating valve 31, part of the heavier phase HP can be returned to the drum 3 in this way. This results in an optimization of the separation process. A control device 37 is used for controlling.

Optionally, the control of the regulating valve 31 can take place within the scope of a regulation, for which purpose a parameter—here of the heavy phase HP—is measured with the measuring device 35. This is indicated here by a type of connection 36 to the control device 37. With the measuring device 35, a parameter here of the second phase HP, e.g., its density, can be determined, wherein the regulating valve can then be opened and closed completely or partially in a controlled manner with the control device 37 on the basis of a regulating algorithm (dashed lines—connection 36).

In order to regulate, for example, the density of the separated heavy phase, a measurement, for example a density measurement (measuring device 35) of the heavy phase can be made at the outlet of the centrifuge. This measured value is sent to the control device 37 (dashed line) and compared with a setpoint value. If a predetermined setpoint, e.g., a density setpoint, has not yet been reached, part of the separated heavy phase HP can be returned to the separation chamber of the drum 3 via a regulating valve. With this process, it is possible to set the actual value of the density of the separated heavy phase HP greater than/equal to a predetermined setpoint. This regulation can be carried out, for example, with a PID controller.

Depending on the product, regulation could alternatively be based on other measured values, such as turbidity, conductivity, volume flow, pH value. It would also be conceivable to make an adjustment based on a volume or mass balance and thus set a desired solids concentration. Further regulations can be based on the flow rate or the feed quantity or the drum speed and/or combinations of these parameters.

In other applications, it may also be useful to use the measured values mentioned to influence the speed of the drum or the volume flow in the feed. If, for example, the measurement shows insufficient concentration of the heavy phase, the feed volume can be changed or the drum speed varied in a suitable way.

The measurements proposed for the heavy phase HP can alternatively or additionally also be carried out in the discharge for the light phase LP. If, for example, turbidity is detected in the light phase, this can be used as a control variable for an adjustment of the feed rate or a suitable adjustment of the drum speed can be used.

In principle, the position of the axis of rotation D is freely selectable in this embodiment, because the magnetic bearing arrangement consisting of the two magnetic bearing devices 4 and 5 permits this. The position of the axis of rotation D can be vertical or horizontal or can have any inclination. The free discharge of the light phase LP can be adjusted by design depending on the position of the rotation axis D. If pumping down of one of the phases HP, LP takes place, this is not absolutely necessary.

Cell separations in the pharmaceutical industry form one possible application of the separator according to the invention. The performance range is intended for processing of broths from fermenters in the range of 100 I-4000 I as well as for laboratory applications.

Other areas of industry in which separators are used would also be conceivable: Chemicals, pharmaceuticals, dairy technology, renewable raw materials, oil and gas, beverage technology, mineral oil, etc. . . . .

In a variation of a separator insert II of FIG. 1 in a second embodiment variant, the form-fitting means 41*a*, 41*b* of the separator insert and the corresponding form-fitting means provided on the frame I can be provided on one side only between the frame I and the separator insert II, thereby also enabling axial and torsional locking of the separator insert II relative to the frame I. This reduces the complexity of the structure, among other things.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

Frame I
Console I-1
Carriage I-2
Rollers I-3
Receptacles I-4, I-5
Separator insert II
Housing 1
Rotor 2
Drum 3
Magnetic bearing devices 4, 5
Stator units 4*a*, 5*a*
Rotor unit 4*b*, 5*b*
Radial boundary wall 6, 7
Supply opening 8
Recirculation inlet 9
Outlets 10, 11
Feed pipe 12
Opening 12*a*
Distributor 13
Distributor shank 14
Distributor foot 15
Distributor channel 16
Separator disk 17
Cylindrical sections 18, 19, 20
Conical sections 18*a*, 20*a*
Outlets 21, 22
Trapping ring chambers 23, 24
Chamber 25
Conical walls 26, 27
Pump 28
Line 29
Branch line 30
Regulating valve 31
Feed pipe 32
Opening 32*a*
Distributor 33
Distributor channels 34
Measuring device 35
Connection 36
Control device 37
Channel 38
Form-fitting means 41*a*, 41*b*, 42
Rotation axis D
Suspension S
Phases LP, HP
Radii ro, ru

The invention claimed is:

1. A separator insert for a separator configured to separate a flowable suspension into at least a light and a heavy phase of different density in a centrifugal field, the separator insert comprising:

a) a housing, which is stationary during operation, wherein the housing is a container that is closed except for a supply opening in a first axial boundary wall of the housing and configured to receive an inflowing suspension;

two outlets in an outer casing of the housing and configured to output the light and heavy phases; and a recirculation inlet in a second axial boundary wall of the housing;

b) a rotor, which is rotatable about an axis of rotation, arranged within the housing, wherein the rotor comprises a drum, which has multiple openings comprising at least one first opening and at least one second opening are configured as free radial outlets for the light and the heavy phase into the housing;

two further openings at two axial ends of the drum;

an upper feed pipe extending into an upper one of the two further openings and a lower feed pipe extending into a lower one of the two further openings, wherein the upper and lower feed pipes do not touch the drum, and wherein one of the upper and lower feed pipes is fluidically coupled to one of the two outlets;

c) separating means arranged in the drum; and d) at least two rotor units arranged at two axially spaced-apart points on the rotor, wherein the at least two rotor units are respectively part of a corresponding magnetic bearing device, and wherein the at least two rotor units are configured to hold the rotor in a suspended state, to rotatably mount the rotor, and to rotate the rotor within the housing during operation of the separator, and wherein the upper feed pipe passes axially through an upper one of the at least two rotor units and the lower feed pipe passes axially through a lower one of the at least two rotor units.

2. The separator insert of claim 1, wherein the separator insert is a pre-assembled, exchangeable unit configured for insertion into a frame of the separator.

3. The separator insert of claim 1, wherein the housing and the drum are made entirely or predominantly of plastic or a plastic composite material.

4. The separator insert of claim 1, wherein the at least two rotor units are arranged at the two axial ends of the drum.

5. The separator insert of claim 4, wherein one or both of the magnetic bearing devices are configured to rotate and adjust a speed of the drum, and one or both of the magnetic bearing devices are configured to act in a radially and axially bearing manner and to maintain the rotor suspended in the drum at a distance from the drum during operation of the separator.

6. The separator insert of claim 1, wherein each of the two outlets is associated with a respective trapping ring chamber of the housing.

7. The separator insert of claim 1, wherein the two outlets are arranged radially or tangentially on the housing.

8. The separator insert of claim 1, wherein the supply opening is formed by the upper feed pipe, which is non-rotatable, which projects with one end out of the housing to a first side with vertical alignment of the axis of rotation upwards, and outwards, and which extends through the first axial boundary wall and through one of the magnetic bearing devices axially into the drum, but does not touch the drum.

9. The separator insert of claim 1, wherein the upper feed pipe passes through the housing concentrically to the axis of rotation of the rotor, then extends axially further within the housing into the drum and ends there with its other end, which is a free outlet end, in front of or in a distributor, wherein the distributor is arranged in the drum and rotates with the drum, and wherein the distributor is configured to conduct the suspension into the centrifugal field.

10. The separator insert of claim 6, wherein the drum has at least two sections of different diameter, and wherein, in order to discharge the output the light and heavy phases of differing density from the drum in the sections of different diameter, the free radial outlets are provided in each case in an outer casing of the drum, wherein the free radial outlets each have one or more nozzle-like openings in the outer casing of the drum outer casing forming the free radial outlets into the respective trapping ring chambers.

11. The separator insert of claim 6, wherein a respective one of the free radial outlets for the respective light or heavy phase is formed at a lowest point of the respective trapping ring chamber.

12. The separator insert of claim 1, wherein a discharge line with a pump is configured to convey the light or heavy phase emerging from one of the free radial outlets away from the housing, and wherein a branch line opens into the recirculation inlet to form a recirculation line configured to return the light or the heavy phase to the drum.

13. The separator insert of claim 12, wherein the pump is configured to recirculate the light or heavy phase into the drum.

14. The separator insert of claim 9, wherein the recirculation inlet comprises the lower feed pipe passing through the second axial boundary wall of the housing and opening into a second distributor in the drum, wherein the second distributor does not rotate with the drum.

15. The separator insert of claim 1, further comprising:

a controllable regulating valve configured to shut off, open completely, or open partially the recirculation inlet.

16. The separator insert of claim 1, further comprising:

at least one measuring device configured to determine a parameter of the light phase or the heavy phase.

17. The separator insert of claim 1, wherein the separating means is a stack of separator disks in the drum.

18. The separator insert of claim 2, wherein all of components of the separator insert are assembled into the pre-assembled unit, wherein all of product-contacting elements of the separator insert are made of plastic or other non-magnetic material.

19. The separator insert of claim 1, wherein the upper and lower feed pipes and the free radial outlets project outwardly from the housing as nozzles that are connected to the housing in a sealed manner or are formed integrally with the housing.

20. The separator insert of claim 1, wherein the housing is hermetically sealed except for openings with the upper and lower feed pipes and the free radial outlets.

21. A separator configured to separate a flowable suspension into at least a light and a heavy phase of different density in a centrifugal field, the separator comprising:

a frame; and a separator insert exchangeably arranged on the frame, wherein the separator insert comprises a) a housing, which is stationary during operation, wherein the housing is a container that is closed except for a supply opening in a first axial boundary wall of the housing and configured to receive an inflowing suspension;

two outlets in an outer casing of the housing and configured to output the light and heavy phases; and a recirculation inlet in a second axial boundary wall of the housing;

b) a rotor, which is rotatable about an axis of rotation, arranged within the housing, wherein the rotor comprises a drum, which has multiple openings comprising at least one first opening and at least one second opening are configured as free radial outlets for the light and the heavy phase into the housing; and two further openings at two axial ends of the drum;

an upper feed pipe extending into an upper one of the two further openings and a lower feed pipe extending into a lower one of the two further openings, wherein the upper and lower feed pipes do not touch the drum, and wherein one of the upper and lower feed pipes is fluidically coupled to one of the two outlets;

c) separating means arranged in the drum; and d) at least two rotor units arranged at two axially spaced-apart points on the rotor, wherein the at least two rotor units are respectively part of a corresponding magnetic bearing device, and wherein the at least two rotor units are configured to hold the rotor in a suspended state, to rotatably mount the rotor, and to rotate the rotor within the housing during operation of the separator, and wherein the upper feed pipe passes axially through an upper one of the at least two rotor units and the lower feed pipe passes axially through a lower one of the at least two rotor units.

22. The separator of claim 21, wherein the frame includes spaced-apart receptacles with stator units of the magnetic bearing devices, between which the housing of the separator insert is insertable in a rotationally fixed and exchangeable manner.

23. The separator of claim 22, wherein a relative distance of the spaced-apart receptacles with the stator units of the bearing devices is adjustable in order to exchange the separator insert.

24. The separator of claim 23, wherein the separator insert is fastenable to the frame in a form-fitted or force-fitted rotationally fixed manner.

25. The separator of claim 23, wherein the housing, the spaced-apart receptacles, and the stator units, comprise corresponding form-fitting means for retaining the housing in a rotationally fixed manner on the receptacle or receptacles.

26. The separator of claim 21, further comprising:

at least one measuring device configured to determine a parameter of the light phase or the heavy phase; and at least one control device configured to control or regulate an amount of recirculation of the light or the heavy phase based on parameters determined by the measuring device.

* * * * *